United States Patent [19]

Yamanaka et al.

[11] Patent Number: 4,725,285
[45] Date of Patent: Feb. 16, 1988

[54] LIQUID COMPOSITIONS OF REACTIVE DYESTUFFS WITH ALKALI METAL POLY(METH)ACRYLATE

[75] Inventors: Nobuyuki Yamanaka, Tokyo; Tamio Sunaga, Otone, both of Japan

[73] Assignee: Nippon Kayaku Kabushiki Kaisha, Tokyo, Japan

[21] Appl. No.: 874,212

[22] Filed: Jun. 13, 1986

[51] Int. Cl.$^4$ .............................................. C09B 67/24
[52] U.S. Cl. ............................................ 8/527; 8/549; 8/558; 8/688; 8/918; 8/543
[58] Field of Search .................... 8/527, 549, 543, 558

[56] References Cited

U.S. PATENT DOCUMENTS

| | | | |
|---|---|---|---|
| 4,036,587 | 7/1977 | Wolf et al. ............................ | 8/557 |
| 4,297,100 | 10/1981 | Koci et al. .............................. | 8/527 |
| 4,435,181 | 3/1984 | Hoguet et al. ......................... | 8/527 |
| 4,500,321 | 2/1985 | Hugelshofer .......................... | 8/527 |
| 4,595,394 | 6/1986 | Okamoto ................................ | 8/139 |

FOREIGN PATENT DOCUMENTS 1499008 1/1978 United Kingdom .
2137671A 10/1984 United Kingdom .

*Primary Examiner*—A. Lionel Clingman
*Attorney, Agent, or Firm*—John P. White

[57] ABSTRACT

Liquid compositions having high storage-stability which contain reactive dyestuffs, alkali metal polyacrylates or alkali metal polymethacrylates with number average degree of polymerization not exceeding 1000 and water. The liquid compositions are useful for a dyeing process of cellulose fiber materials.

9 Claims, No Drawings

LIQUID COMPOSITIONS OF REACTIVE DYESTUFFS WITH ALKALI METAL POLY(METH)ACRYLATE

This invention relates to liquid compositions of dyestuffs, or in more detail, to liquid compositions of reactive dyestuffs having high storage-stability.

Dyestuff compositions in the form of liquid (solution or slurry state) have an advantage over those in the form of solid (powder or grain state), because of non-dusting and of suitability for measurement in automatic liquid feeder system. However, the storage-stability of liquid compositions of dyestuffs is often inferior after long-term storage to those of powder compositions, in decomposition and crystallization of dyestuffs. Liquid compositions of reactive dyestuffs, in particular, lose their reactivity to cellulose fibre by a hydrolysis of their reactive groups (spontaneous decomposition), so that troubles derived from reduction of the dye exaustion by fibre are frequently experienced. Consequently, on preparing liquid compositions of reactive dyestuffs, buffers to maintain a certain pH value and/or chelating agents to prevent influences of alkaline earth metal ions such as calcium ion and magnesium ion, may be added.

As those buffers and chelating agents, phosphates such as sodium phosphate, potassium phosphate are often used.

When phosphates are used for preparation of liquid compositions of reactive dyestuffs, they are not so much able to inhibit the decomposition of reactive groups of reactive dyestuffs, and after the liquid compositions thus obtained are stored for a long term, the phosphates tend to crystallize out. Moreover, use of phosphates is, in itself, unfavorable from point of view of environment pollution.

As a result of the elaborate investigations by the inventors to find out additives for preparing liquid compositions of reactive dyestuffs in order to solve the above-mentioned problems, the present invention has been accomplished on finding that the liquid compositions of reactive dyestuffs containing alkali metal polyacrylates or methacrylates with number average degree of polymerization not exceeding 1,000 do not cause to decompose the reactive groups of the reactive dyestuffs, and exhibit extremely high storage-stability to aging.

As a reactive dyestuff which is used in the present invention, there may be mentioned a water-soluble reactive-dyestuffs provided for the above-mentioned conditions.

Moreover, the number average degree of polymerization of alkali metal polyacrylates or polymethacrylates used according to the present invention does not exceed 1,000, preferably 100, and more preferably, is from 15 to 50. Those metal salts may be copolymerized with co-polymerizable monomer such as maleic acid and succinic acid in such small quantities as not cancel the effect according to this invention. As an alkali metal in alkali metal polyacrylates or polymethacrylates, sodium, potassium or lithium is mentioned and sodium salts thereof are usually employed. A mixture of the alkali metal polyacrylates and the alkali metal polymethacrylates may be also used and a mixture of two or more of reactive dyestuffs may be also used.

It is favorably prepared for the liquid compositions to contain 0.1 to 5.0% by weight, preferably 0.2 to 2.0% by weight of the alkali metal polyacrylates and/or polymethacrylates, 5 to 60% by weight, preferably 10 to 40% by weight of a reactive dyestuff and 35 to 90% by weight of water.

The liquid compositions of this invention may be prepared by adding the alkali polyacrylates or polymethacrylates and water, and, if necessarily, also other additives to a reaction mixture containing reactive dyestuffs, or filter-cake obtained by filtration continued on salting-out. To improve stability of the liquid compositions to aging, reaction solutions containing reactive dyestuffs or reactive dyestuff filter-cakes obtained by salting-out may be used after desalting and concentrating reaction solutions by passing them through separation membranes such as cellulose acetate membrane or polybenzimidazolone membrane (PBIL). Usual additives such as N-methyl pyrrolidone, ε-caprolactam may be added to the liquid compositions prepared according to the present invention and, if desired, the liquid compositions prepared according to the above-mentioned process may be adjusted to pH 6.0 to 8.5 to improve much more storage-stability to aging by using acids or alkalis.

EXAMPLES

The invention is illustrated in detail by the following Examples in which the percentages are by weight.

EXAMPLE 1

500 g of a filter-cake of the reactive dyestuff of the following formula:

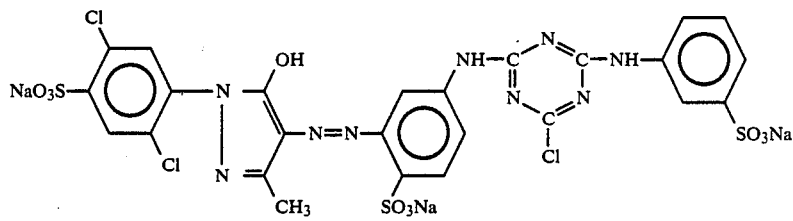

tive dyestuff containing one to four reactive halogen atoms capable of reacting with a textile fibre which is mentioned in the Colour Index. Desirable reactive dyestuffs to obtain the liquid compositions of the present invention are reactive dyestuffs having one or two triazinyl group(s) which carry one or two chlorine atom(s) as a reactive group(s). However, the present invention is not limited thereby and may be applied to any reac- containing 8% of dry solid matter of the dyestuff and 3% of common salt (NaCl), were dissolved in 1.5 kg of ion-exchanged water. The obtained aqueous solution was subjected to desalting and concentrating through PBIL membrane (MTL-290, manufactured by Teijin Engineering Co., with membrane area 200 cm$^2$) at pH 6.8 at a temperature of 25° C. under a pressure of 10 to 30 kg/cm$^2$ (membrane treatment). By adding 3 kg of ion-exchanged water in the course of membrane treatment, 4.5 kg of effluent in total amounts were obtained. In this manner, 500 g of a concentrated solution (A) of the reactive dyestuff containing about 30% of dry solid matter and 0.1% of NaCl were obtained. 50 g of the concentrate solution (A) thus obtained were added to a solution containing 44 g of water and 1 g of sodium polyacrylate of number average degree of polymerization of 25 and well stirred. It was found that the liquid composition of the reactive dyestuff with pH 7.5 did not exhibit any deterioration such as spontaneous decomposition and crystal segregation of dyestuff even after 3 months storage at a temperatures from −5° C. to 40° C., and, though frozen, they could be dissolved completely by thawing and consequently provided with excellent stability of aging.

The contents of the liquid composition of the reactive dyestuff were as follows:

| Reactive dyestuff (as dry solid matter) | 13% |
| --- | --- |
| Sodium polyacrylate | 1% |
| NaCl | 0.05% |
| Water | ca. 86% |

COMPARATIVE EXAMPLE 1

A liquid composition of the reactive dyestuff which was prepared in the same manner as in Example 1 except no attition of sodium polyacrylate, exhibited pH 6.7 and after 3 months storage precipitated dyestuff, which was not completely dissolved again.

EXAMPLE 2

70 parts of the concentrated solution (A) obtained in Example 1 were added to a solution containing 1 part of lithium polyacrylate with number average degree of polymerization of 25, 19 parts of ion-exchanged water and 10 parts of ε-caprolactam and well agitated. The liquid composition thus obtained of the reactive dyestuff had pH 7.5 and did not exhibit any deterioration such as decomposition and precipitation of dyestuff even after 3 months storage at a temperature from −5° C. to +40° C.

The contents of the liquid composition of the reactive dyestuff were as follows:

| Reactive dyestuff (as dry solid matter) | 18% |
| --- | --- |
| Lithium polyacrylate | 1% |
| NaCl | 0.7% |
| ε-Caprolactam | 10% |
| Water | ca. 70% |

EXAMPLE 3

20 kg of the reaction solution from synthesis of the metal complex dyestuff of the formula:

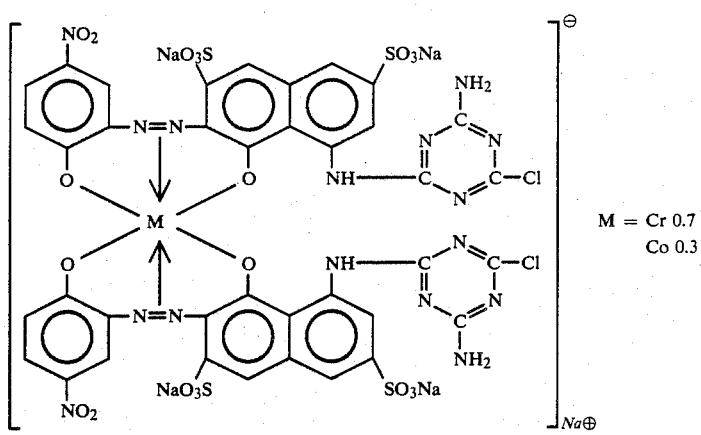

M = Cr 0.7
Co 0.3 containing 10.0% of dry solid matter and 3% of common salt, were desalted and concentrated by cellulose acetate membrane (manufactured by UOP, with membrane area 1.55 m²). Thus, a solution containing 4 kg of the concentrate solution (B) of the reactive dyestuff and 16 kg of effluent is obtained. 80 parts of the concentrate solution (B) were added to a solution containing 2 parts of sodium polyacrylate and 18 parts of ion-exchanged water and then well agitated. The liquid compositions obtained of the reactive dyestuff were stable and did not deteriorate even after 3 months storage at a temperatures from −5° C. to +40° C. The liquid compositions had pH 7.1 and the following contents.

| Reactive dyestuff (as dry solid matter) | 38% |
| --- | --- |
| Sodium polyacrylate | 2% |
| NaCl | 0.18% |
| Na₂SO₄ | 0.17% |
| Water | ca. 60% |

COMPARATIVE EXAMPLE 2

80 parts of the concentrated solution (B) of the reactive dyestaff in Example 3 were diluted with 20 parts of water and well agitated. The obtained liquid composition was coagulated after 3 months storage at a temperatures from −5° C. to +40° C., and a remarkable decomposition of the reactive group (—Cl) was observed.

EXAMPLE 4

A liquid composition of reactive dyestuff was obtained by adding one part of sodium polyacrylate with number average degree of polymerization of 25 and 9 parts of ion-exchanged water to 90 parts of the reaction solution of synthesis of the reactive dyestuff of the formula:

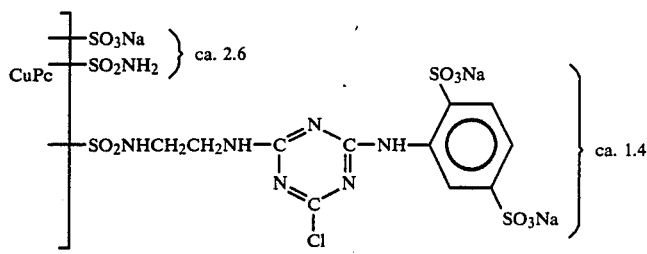

containing 18.0% of dry matter and 3.8% of common salt. This composition was stable even after 3 months storage at a temperatures from −5° C. to +40° C. and any deterioration was not observed.

The contents of the liquid composition was as follows.

| Reactive dyestuff (as dry solid matter) | 16.2% |
|---|---|
| Sodium polyacrylate | 1.0% |
| NaCl | 2.9% |
| Na$_2$SO$_4$ | 0.5% |
| Water | ca. 80% |

EXAMPLE 5

By using sodium polymethacrylate with number average degree of polymerization of 25 in place of sodium polyacrylate in Example 1, the stable liquid composition obtained did not deteriorate even after 3 months storage at a temperatures from −5° C. to +40° C. The contents of this liquid composition were as follows.

| Reactive dyestuff (as dry solid matter) | 13% |
|---|---|
| Sodium polymethacrylate | 1% |
| NaCl | 0.05% |
| Water | ca. 86% |

EXAMPLE 6

By processing in the same manner as in Example 1, using sodium salt of a polyacrylic acid-maleic anhydride copolymer with number average degree of polymerization of 40 in place of 25, a liquid composition was obtained, which did not deteriorate even after 3 months storage at a temperatures from −5° C. to +40° C. The contents of this liquid composition were as follows:

| Reactive dyestuff (as dry solid matter) | 13% |
|---|---|
| Sodium salt of the copolymer of acrylic acid with maleic anhydride | 1% |
| NaCl | 0.05% |
| Water | ca. 86% |

EXAMPLE 7

In the similar manner to that of Example 1, a concentrated solution of the reactive dyestuff of the formula:

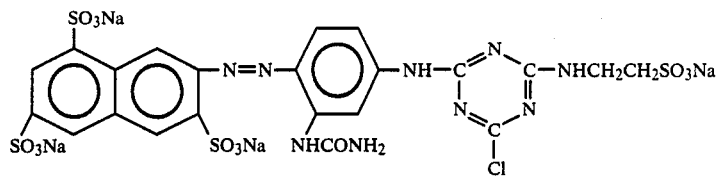

was obtained, which contained 40% of the dyestuff (as dry solid matter), 0.5% of NaCl and 0.4% of Na$_2$SO$_4$. 62 g of the concentrate solution were added to a solution containing 34 g of water and 4 g of sodium polyacrylate with number average degree of polymerization of 25 and the mixture thus obtained well agitated. The obtained liquid composition of the reactive dyestuff which had pH 8.0 did not cause deterioration such as spontaneous decomposition and crystallization of the dyestuff even after 3 months storage at a temperature from 0° C. to +40° C. The contents of the liquid composition of the reactive dyestuff were as follows:

| Reactive dyestuff (as dry solid matter) | 25% |
|---|---|
| Sodium polyacrylate | 4% |
| NaCl | 0.3% |
| Na$_2$SO$_4$ | 0.2% |
| Water | ca. 70% |

COMPARATIVE EXAMPLE 3

A liquid composition of the reactive dyestuff which was prepared in the same manner as in Example 7 except without sodium polyacrylate, exhibited pH 7.0, and after 3 months storage at 0° C. caused precipitation, and also at 40° C., decomposed by 40% of the reactive group (—Cl) of the dyestuff. The contents of the liquid composition of the reactive dyestuff were as follows:

| Reactive dyestuff (as dry solid matter) | 25% |
|---|---|
| NaCl | 0.3% |
| Na$_2$SO$_4$ | 0.2 |
| Water | ca. 74% |

EXAMPLE 8

In the similar manner as in Example 1, a concentrated solution of the reactive dyestuff of the formula:

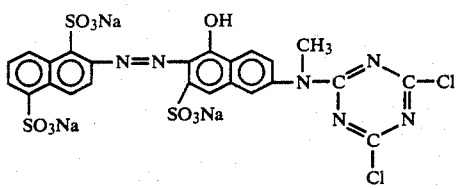

was obtained, which contained 35% of dyestuff (as dry solid matter), 0.8% of NaCl and 0.5% of Na₂SO₄. 57 g of the obtained concentrated solution were added to a solution containing 39 g of water and 4 g of sodium polyacrylate with number average degree of polymerization of 25 and well agitated. This liquid composition of the reactive dyestuff exhibited pH 7.8 and after 3 months storage at 0° C., did not cause crystallization of the dyestuff, and also at 40° C., decomposed by 8% of the reactive group (—Cl) of the dyestuff. The contents of the liquid composition of the reactive dyestuff were as follows:

| Reactive dyestuff (as dry solid matter) | 20% |
|---|---|
| Sodium polyacrylate | 4% |
| NaCl | 0.5% |
| Na₂SO₄ | 0.3% |
| Water | ca. 75% |

COMPARATIVE EXAMPLE 4

A liquid composition of the reactive dyestuff containing no sodium polyacrylate which was prepared with the concentrated solution of the reactive dyestuff, used in Example 3. exhibited pH 6.7, and after 3 months storage at 0° C. did not crystallize dyestuff, however at 40° C. decomposed by 22% of the reactive group (—Cl) of the dyestuff. The contents of the liquid composition were as follows:

| Reactive dyestuff (as dry solid matter) | 20% |
|---|---|
| NaCl | 0.5% |
| Na₂SO₄ | 0.3% |
| Water | ca. 79% |

APPLICATION EXAMPLE

A printing paste of the following contents:

| Liquid composition described in Example 1 | 10 parts |
|---|---|
| 5% aqueous solution of sodium alginate | 50 parts |
| Sodium hydrogen carbonate | 2 parts |
| Urea | 5 parts |
| Water | 33 parts | was prepared, by which cotton fabrics were printed and subjected to steaming at 102° C. for 10 min. to obtain yellow printed matter.

What we claim is:

1. A liquid composition comprising 0.1 to 5% by weight of an alkali metal polyacrylate or polymethacrylate, or a mixture thereof, having a number average degree of polymerization not exceeding 1000, 5 to 60% by weight of a water-soluble reactive dyestuff which includes one triazinyl group or two triazinyl groups, each such group carrying one chlorine atom or two chlorine atoms as a reactive group, and 35 to 90% by weight water.

2. A liquid composition according to claim 1, wherein the reactive dyestuff has either one triazinyl group or two triazinyl groups, each such group carrying one chlorine atom as the reactive group.

3. A liquid composition according to claim 1 or 2, wherein the number average degree of polymerization of the alkali metal polyacrylate or polymethacrylate does not exceed 100.

4. A liquid composition according to claim 1 or 2, wherein the alkali metal polyacrylate or polymethacrylate comprises a sodium polyacrylate or sodium polymethacrylate.

5. A liquid composition according to claim 3, wherein the alkali metal polyacrylate or polymethacrylate comprises a sodium polyacrylate or sodium polymethacrylate.

6. A liquid composition according to claim 1 or 2 having a pH value of 6.0 to 8.5.

7. A liquid composition according to claim 3 having a pH value of 6.0 to 8.5.

8. A liquid composition according to claim 4 having a pH value of 6.0 to 8.5.

9. A liquid composition according to claim 5 having a pH value of 6.0 to 8.5.

* * * * *